US009940955B2

(12) United States Patent
Nishioka et al.

(10) Patent No.: US 9,940,955 B2
(45) Date of Patent: Apr. 10, 2018

(54) TUNNEL MAGNETORESISTANCE MAGNETIC SENSOR WITH SCISSOR SENSOR AND MULTI-SEED LAYER CONFIGURATION

(71) Applicant: HGST Netherlands B.V., Amsterdam (NL)

(72) Inventors: Kouichi Nishioka, Hiratsuka (JP); Zheng Gao, San Jose, CA (US); Ching Tsang, Sunnyvale, CA (US); Quang Le, San Jose, CA (US); Sangmun Oh, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/956,251

(22) Filed: Dec. 1, 2015

(65) Prior Publication Data
US 2017/0154643 A1    Jun. 1, 2017

(51) Int. Cl.
G11B 5/39    (2006.01)
(52) U.S. Cl.
CPC .......... *G11B 5/3912* (2013.01); *G11B 5/3909* (2013.01); *G11B 5/3929* (2013.01); *G11B 5/3945* (2013.01); *G11B 2005/3996* (2013.01)
(58) Field of Classification Search
None
See application file for complete search history.

(56) References Cited

U.S. PATENT DOCUMENTS

| 7,961,438 | B2 | 6/2011 | Mizuno et al. |
| 8,018,691 | B2 | 9/2011 | Gill et al. |
| 8,179,642 | B2 | 5/2012 | Kawamori et al. |
| 8,233,247 | B2 | 7/2012 | Carey et al. |
| 8,582,250 | B2 | 11/2013 | Qiu et al. |
| 8,659,855 | B2 | 2/2014 | Dimitrov et al. |
| 8,749,926 | B1 | 6/2014 | Le et al. |
| 8,907,666 | B2 | 12/2014 | Le et al. |
| 9,177,575 | B1 * | 11/2015 | Gao et al. ............ G11B 5/3909 |
| 2003/0197987 | A1 * | 10/2003 | Saito ................... G11B 5/3909 360/324.2 |
| 2005/0002129 | A1 * | 1/2005 | Gill ...................... G11B 5/3912 360/324.11 |

(Continued)

FOREIGN PATENT DOCUMENTS

JP    2009289390 A    12/2009

OTHER PUBLICATIONS

Nakatani, T. et al., "Oscillatory Antiferromagnetic Interlayer Exchange Coupling in Co2Fe(Al0.5Si0.5)/Ag/Co2Fe (Al0.5Si0.5) Films and its Application to Trilayer Magnetoresistive Sensor," Applied Physics Letters, vol. 99, No. 18, Oct. 2011, 4 pages.

(Continued)

*Primary Examiner* — Craig A. Renner

(57) ABSTRACT

A read head is provided with a scissors sensor. The read head may include a bottom magnetic shield, and a first non-magnetic seed layer, a magnetic seed layer, a second non-magnetic seed layer, an antiferromagnetic layer, a coupling layer, a first free magnetic layer, a spacer layer, and a second free magnetic layer positioned above the bottom magnetic shield, in this order. A pair of magnetic side shield layers may be positioned on respective sides of the second free magnetic layer.

22 Claims, 13 Drawing Sheets

246 = Second antiferromagnetic (AFM) layer
244 = Second top magnetic layer
242 = Anti-parallel coupling layer
240 = First top magnetic layer
238 = Cap layer
236 = Magnetic side shields
232 = Second free magnetic layer
230 = Spacer
228 = First free magnetic layer
226 = First coupling layer
225 = Insulator layer
222 = First antiferromagnetic (AFM) layer
220 = Second non-magnetic seed layer
218 = First magnetic seed layer
216 = Grain growth seed layer
214 = First non-magnetic seed layer
212 = Bottom magnetic shield
234 = Read sensor

(56) References Cited

U.S. PATENT DOCUMENTS

| | | | | |
|---|---|---|---|---|
| 2005/0002131 A1* | 1/2005 | Gill | ............... | G11B 5/3912 |
| | | | | 360/324.12 |
| 2008/0144235 A1* | 6/2008 | Gill | ............... | G11B 5/3906 |
| | | | | 360/324.12 |
| 2014/0268428 A1* | 9/2014 | Dimitrov et al. | .... | G11B 5/3912 |
| | | | | 360/313 |
| 2015/0002961 A1 | 1/2015 | Keener et al. | | |

OTHER PUBLICATIONS

Nakatani, T. et al., "Scissors-type Trilayer Giant Magnetoresistive Sensor using Heusler Alloy Ferromagnet for Narrow Reader of Ultra-high Density Hard Disk Drives," Press Release of the National Institute for Materials Science, Available Online at http://www.nims.go.jp/eng/news/press/2011/10/p201110310.html, Oct. 31, 2011, 3 pages.

* cited by examiner

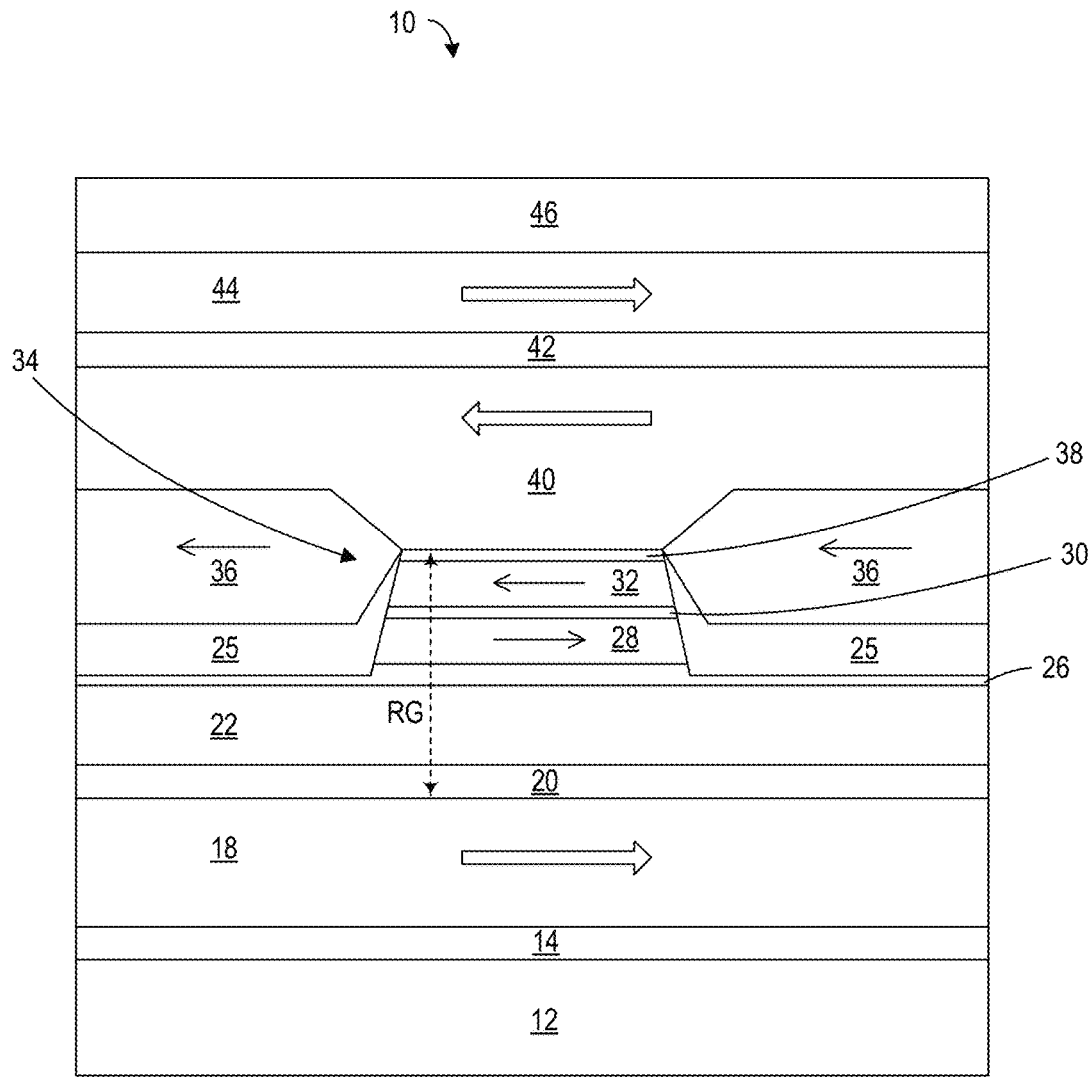

46 = Second antiferromagnetic (AFM) layer
44 = Second top magnetic layer
42 = Anti-parallel coupling layer
40 = First top magnetic layer
38 = Cap layer
36 = Magnetic side shields
32 = Second free magnetic layer
30 = Spacer
28 = First free magnetic layer
26 = First coupling layer
25 = Insulator layer
22 = First antiferromagnetic (AFM) layer
20 = Second non-magnetic seed layer
18 = First magnetic seed layer
14 = First non-magnetic seed layer
12 = Bottom magnetic shield
34 = Read sensor

FIG. 5

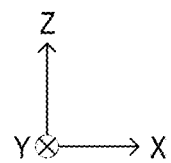

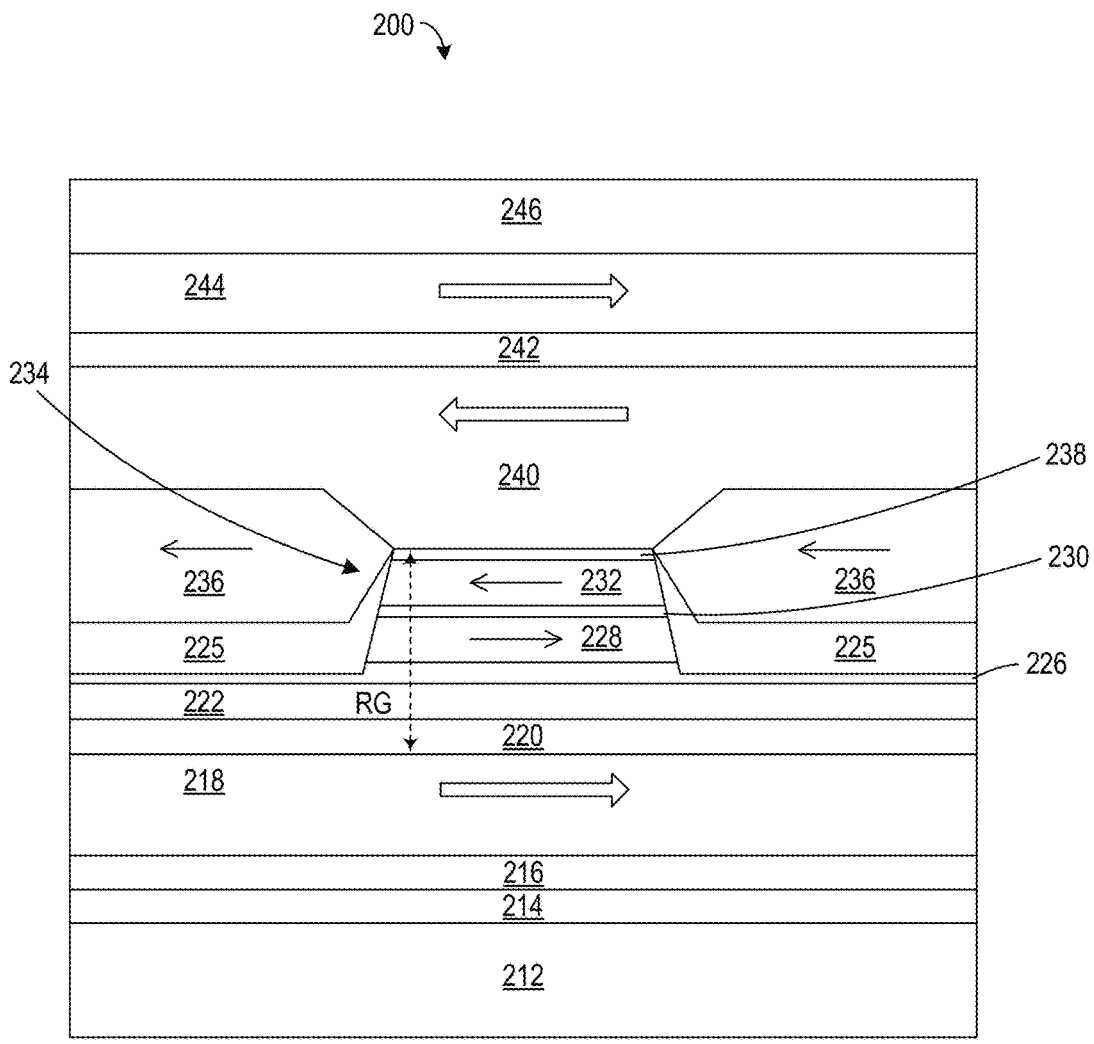

246 = Second antiferromagnetic (AFM) layer
244 = Second top magnetic layer
242 = Anti-parallel coupling layer
240 = First top magnetic layer
238 = Cap layer
236 = Magnetic side shields
232 = Second free magnetic layer
230 = Spacer
228 = First free magnetic layer
226 = First coupling layer
225 = Insulator layer
222 = First antiferromagnetic (AFM) layer
220 = Second non-magnetic seed layer
218 = First magnetic seed layer
216 = Grain growth seed layer
214 = First non-magnetic seed layer
212 = Bottom magnetic shield
234 = Read sensor

FIG. 6

328 = First free magnetic layer
328d = CoFe layer
328c = CoFeB layer
328b = CoFeBTa layer
328a = Ni layer
326 = First coupling layer
324 = Pinned layer
322 = Antiferromagnetic (AFM) layer

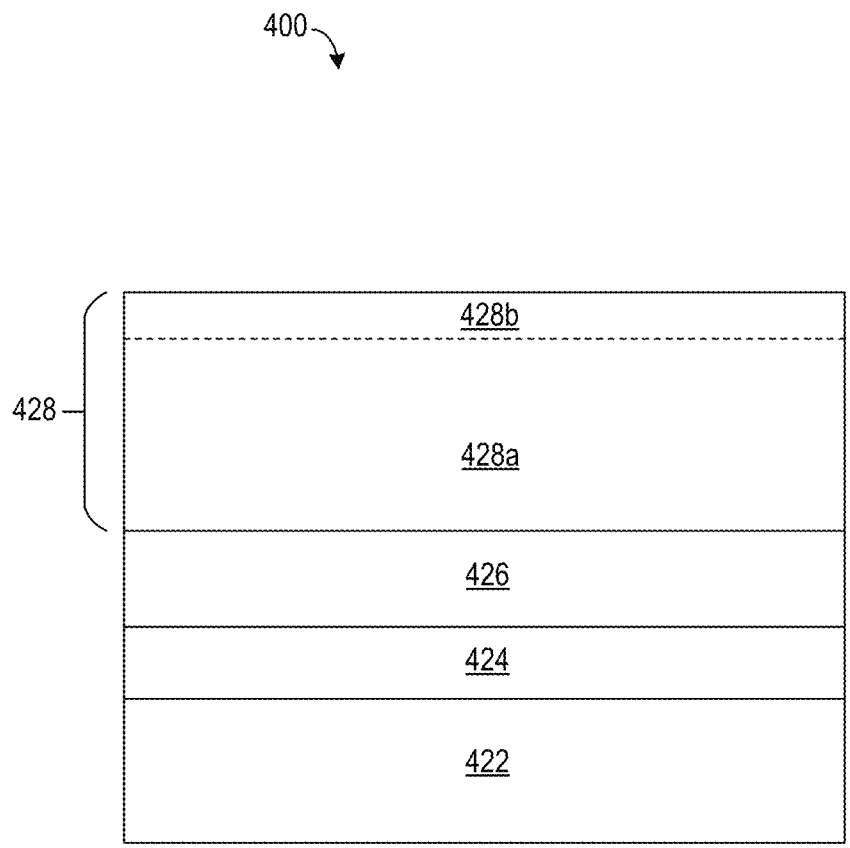
- 428 = First free magnetic layer
- 428b = Co10Fe layer
- 428a = Ni15Fe layer
- 426 = First coupling layer
- 424 = Pinned layer
- 422 = Antiferromagnetic (AFM) layer
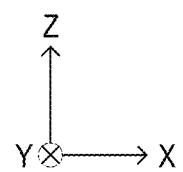
FIG. 12

TUNNEL MAGNETORESISTANCE MAGNETIC SENSOR WITH SCISSOR SENSOR AND MULTI-SEED LAYER CONFIGURATION

BACKGROUND

In recent years, the read heads of magnetoresistive devices and recording bits on magnetic recording media have become progressively smaller, and as a result, the recording density of stored data has increased. Smaller recording bits generate smaller magnetic flux and smaller output signals, which increase the sensitivity requirements of the read head. A scissor type sensor, which has two free ferromagnetic layers being coupled in anti-parallel directions relative to each other, has been proposed to further improve the sensitivity of the read head. One difficulty encountered is that, while read heads with scissor type sensors exhibit strong magnetic coupling between the shields and the free ferromagnetic layers for improved sensitivity, this strong magnetic coupling allows the scissors sensors to detect extraneous recording bits that were not the intended target recording bits, leading to a decreased resolution and increased magnetic read gap relative to the physical read gap. These complications have limited the practical application of scissor type sensors in conventional magnetoresistive devices.

SUMMARY

To address the above described challenges, a TMR (tunnel magnetoresistance) and CPP-GMR (current perpendicular to plane giant magnetoresistive) read head is provided. The read head comprises a bottom magnetic shield; and a first non-magnetic seed layer, a magnetic seed layer, a second non-magnetic seed layer, an antiferromagnetic layer (AFM), a coupling layer, a first free magnetic layer, a spacer layer, and a second free magnetic layer positioned above the bottom magnetic shield, in this order. A pair of magnetic side shield layers is positioned on respective sides of the second free magnetic layer. A soft bias layer is positioned behind the first free magnetic layer (FL1) and the second free magnetic layer (FL2), in a direction away from the air bearing surface, in order to give both FL1 and FL2 a bias magnetic field in the stripe height direction. Since the FL1 receives a bias field from the AFM in the track width + direction and the FL2 receives a bias field from the pair of magnetic shields in the track width − direction, the FL1 and FL2 assume a scissor magnetic configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIG. 5 is an air bearing surface view of a magnetic read head according to the first embodiment of the invention;

FIG. 6 is an air bearing surface view of a magnetic read head according to the second embodiment of the invention;

FIG. 12 is an air bearing surface view of a magnetic read head according to the fourth embodiment of the invention.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
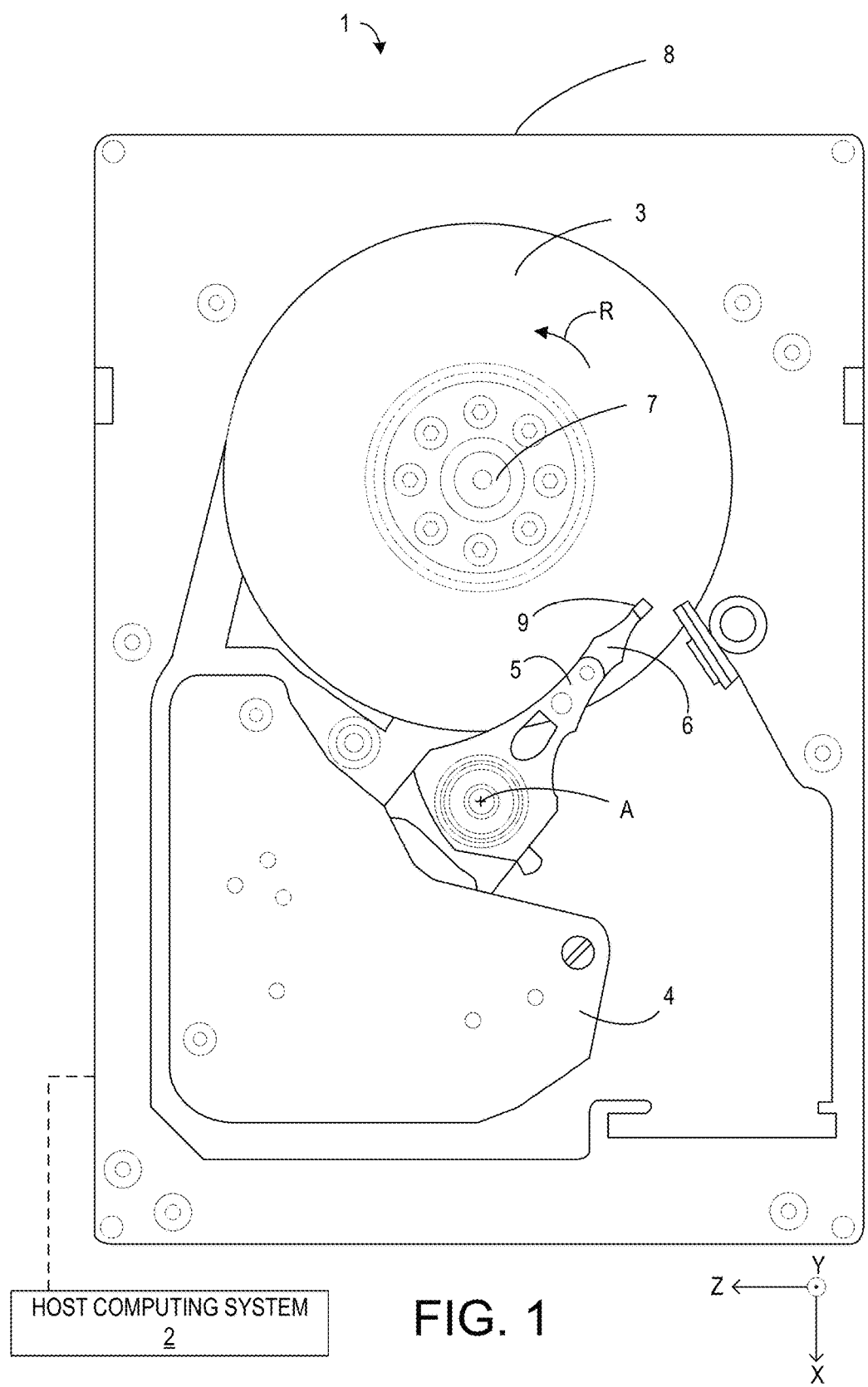
FIG. 1 illustrates an exemplary magnetic disk drive, according to one disclosed embodiment.
Figure 2:
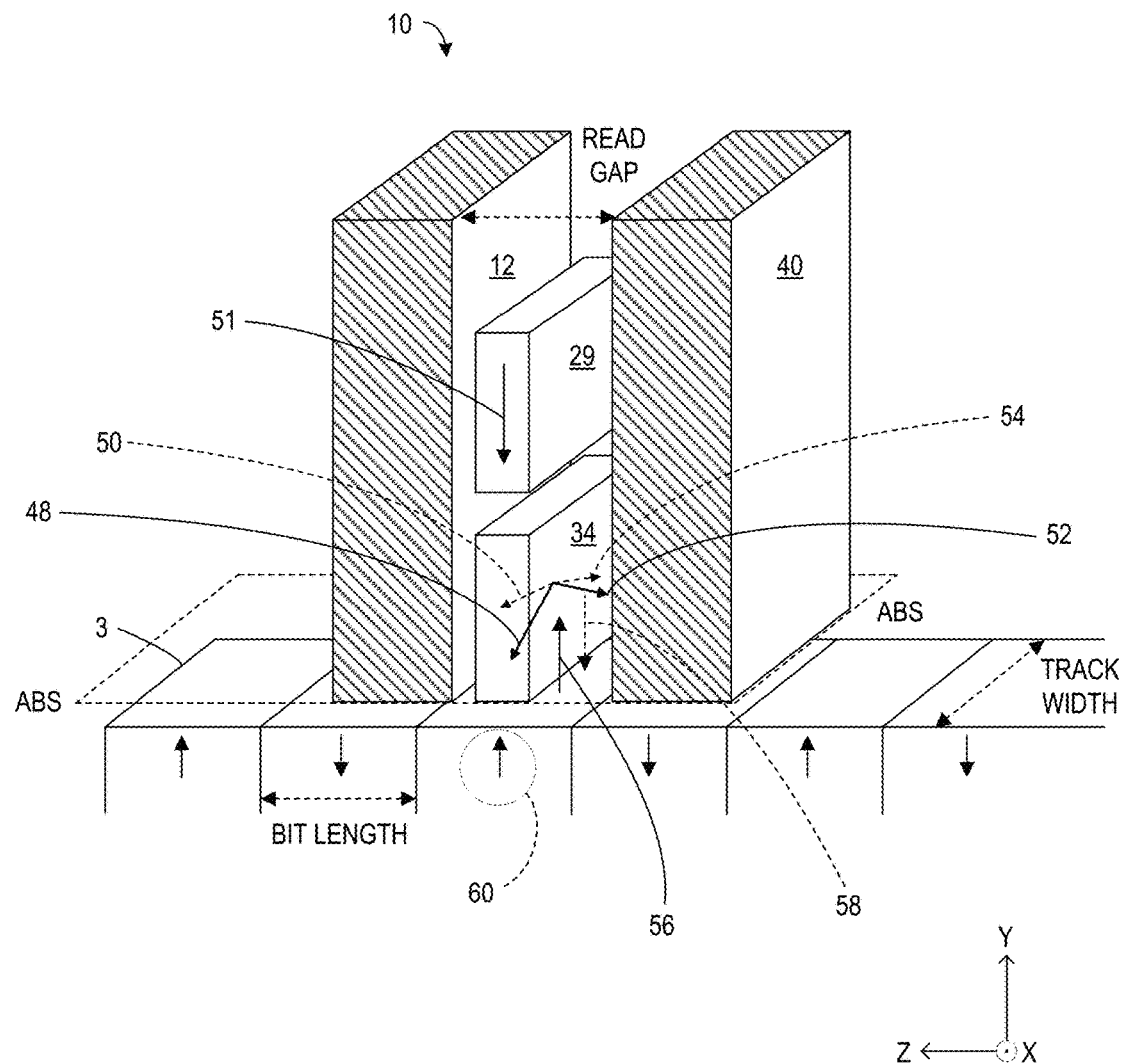
FIG. 2 is a schematic partial cross-sectional view through the middle section of a magnetic read head according to an embodiment of the invention.

The present disclosure is directed to a TMR (tunnel junction magnetoresistive) and CPP-GMR (current perpendicular to plane giant magnetoresistive) read head, an embodiment of which is shown beginning in FIG. 2, for a magnetic recording system such as a disk drive as shown in FIG. 1.

Turning initially to FIG. 1, this Figure illustrates a top view of an exemplary hard disk drive (HDD) 1, according to an embodiment of the disclosure. Hard disk drive (HDD) 1 is coupled to an associated host computing system 2, and is used to store information used by the computing system during processing. As illustrated, HDD 1 may include one or more perpendicular magnetic recording media 3, actuators 4, actuator arms 5, and suspension arms 6 associated with each of the perpendicular magnetic recording media 3, and a spindle motor 7 affixed in a chassis 8. The perpendicular magnetic recording media 3 may be arranged in a vertical stack, if more than one is provided. Moreover, the one or more perpendicular magnetic recording media 3 may be coupled with the spindle motor 7 for rotation in a rotation direction R.

Perpendicular magnetic recording media 3 may include tracks of data on both the top and bottom surfaces of the disk. A magnetic head mounted in a slider 9 may be positioned on a track. As each disk spins, data may be written on and/or read from the data track via a corresponding read head and write head of the recording head. The slider 9 and magnetic head contained therein may be coupled to an actuator arm 5 via a suspension arm 6. Actuator arm 5 may be configured to rotate about actuator axis A to place the magnetic head within slider 9 on a particular data track. It is to be understood that the actuator arm 5 alternatively may be configured to move in a manner other than swiveling around actuator axis A.

The suspension arm 6 biases the slider so that the slider bends towards the surface of the perpendicular magnetic recording media 3 when stationary. When the perpendicular magnetic recording media 3 rotates, air is swirled by the rotating disk 3 adjacent to a media facing surface (MFS) of the slider 9, causing the slider 9 to ride on an air bearing a slight distance from the surface of the rotating media 3. For this reason, the MFS is also referred to as an air bearing surface (ABS). When the slider rides on the air bearing, the read and write heads are employed for reading and writing magnetic transitions corresponding to host data of the host computing system 2. The read and write heads are connected to signal processing circuitry that operates according to a computer program implemented in a processor or other logic circuitry integrated within or coupled to the HDD 1 to thereby implement the writing and reading functions.

FIG. 2 is a schematic partial cross-sectional view through the middle section of a read head 10 of the magnetic head within the slider 9 of FIG. 1, facing the recording media 3. The read head 10 in the magnetoresistive device includes an ABS, and is mounted such that the ABS is facing the recording media 3. The recording media 3 is illustrated with perpendicularly recorded or magnetized bits, each of which occupies a region of the recording media 3 defined by a bit length and track width, with adjacent regions having magnetization directions as represented by the arrows located in the recording media 3. The magnetic fields of the adjacent bits are not detectable by the read sensor 34 in the read head 10. The read sensor 34 is positioned between a first top magnetic layer 40 and a bottom magnetic shield 12, each formed of a soft magnetic metal film. A soft bias layer 29 is positioned behind the read sensor 34 in a direction away from the ABS to provide a bias magnetic field to the read sensor 34. The recording density in the bit length direction is determined by the read gap between the first top magnetic layer 40 and the bottom magnetic shield 12. It is to be understood that while the description has been made with reference to perpendicularly recorded regions, the embodiments disclosed herein are not limited to perpendicular magnetic recording. The embodiments disclosed herein are equally applicable to other magnetic recording possibilities as well. It will be appreciated that this is a schematic view with some layers of the read head 10 omitted and proportions exaggerated to illustrate the relationships between the magnetic shields, read sensor 34, and recording media 3.

Figure 3:
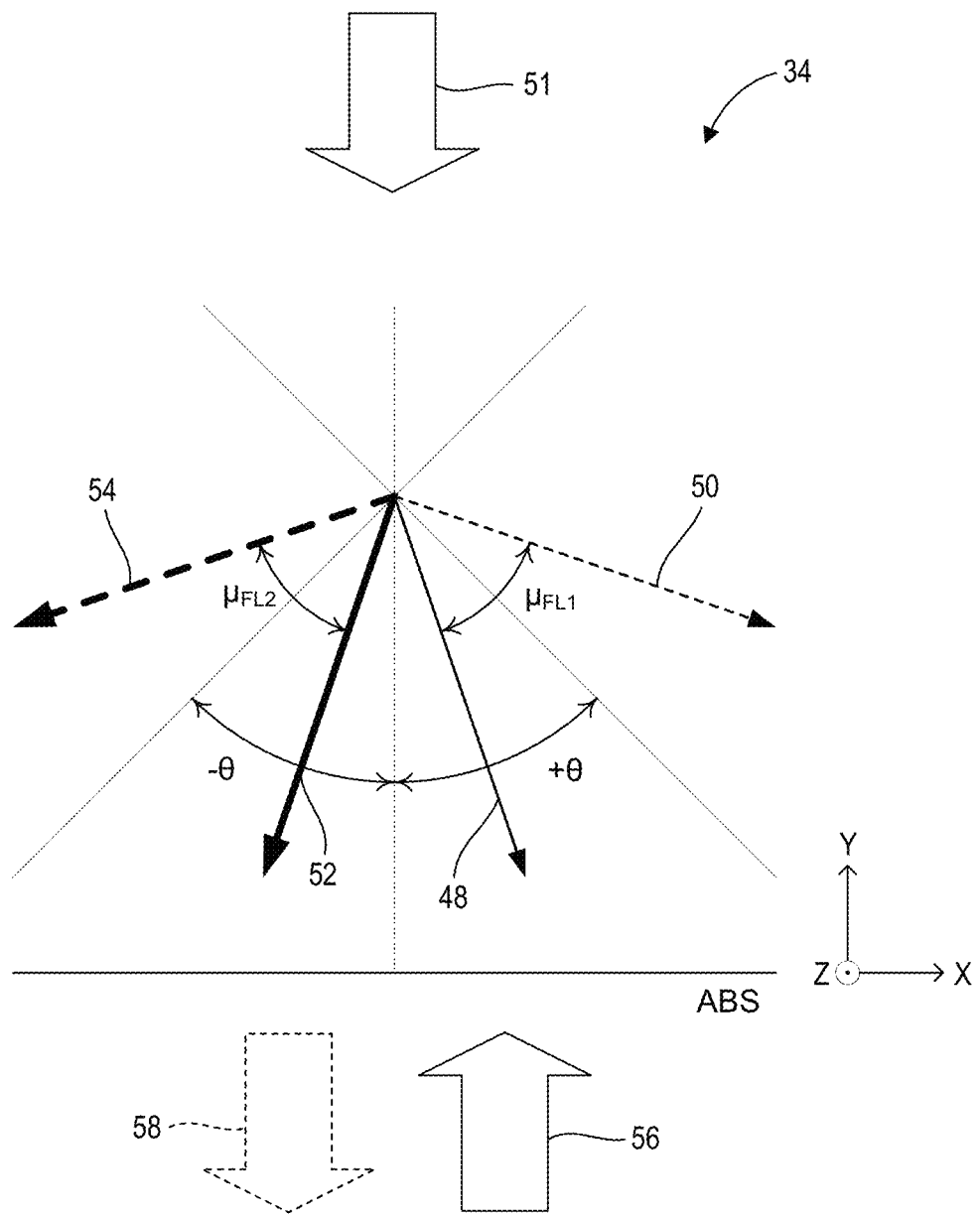
FIG. 3 is a schematic view of the magnetization directions of the read sensor of the magnetic read head according to an embodiment of the invention.

Referring to FIGS. 2 and 3, a stray magnetic field 56 from the media is applied to the read sensor 34 of the TMR read head 10 in the depth direction (Y-axis direction), so that the magnetic moments $\mu_{FL1}$ and $\mu_{FL2}$ of the read sensor 34 may be configured in opposite directions, including magnetization directions 50 and 54 that tilt from the ABS. A bias magnetic field 51 is applied to the read sensor 34 from the soft bias layer 29 in the stripe height direction (-Y direction). FIG. 3 is a schematic view of the magnetization directions of the read sensor 34 of the magnetic read head 10. The read sensor 34 receives a bias magnetic field 51 from the soft bias layer 29 in the -Y direction, and also receives bias fields in the -X and +X directions from the first magnetic seed layer 18 and the first top magnetic layer 40, respectively. If one of the magnetic moments tilts toward the +θ direction, the other magnetic moment tilts towards the opposite -θ direction. These magnetic configurations are established by the +X direction bias field, the -X direction bias field, and the -Y direction bias field. These three kinds of bias fields are generated by a +X biasing measure, -X biasing measure, and -Y biasing measure, respectively. As a stray magnetic field 56 from the media is applied, flowing from the ABS side into the device side, both magnetic moments of the read sensor 34 change their directions to grow more parallel to the ABS, as illustrated by the magnetization directions 50 and 54. On the other hand, when an opposite stray magnetic field 58 flowing from the device side into the ABS side is applied, both magnetic moments of the read sensor 34 change their directions to grow more perpendicular to the ABS, as illustrated by the magnetization directions 48 and 52. By measuring the changes of the magnetic moments of the read sensor 34 as a resistance change, it is possible to detect different stray magnetic fields 56 and 58 from the media depending on the target bit 60 that is being read on the recording media 3.

Figure 4:
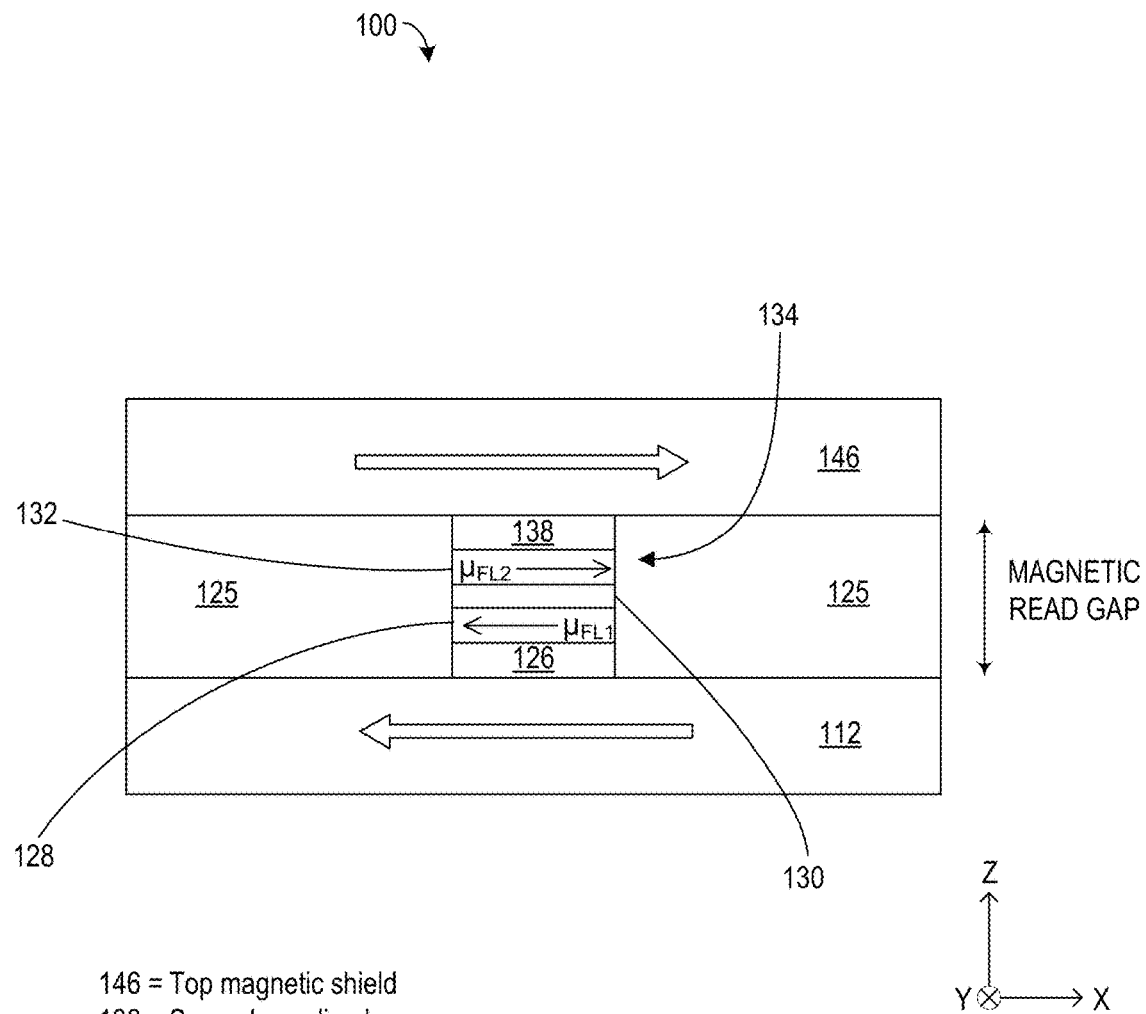
FIG. 4 is an air bearing surface view of a conventional scissor type magnetic read sensor.

Referring to FIG. 4, an air bearing surface view of a conventional scissor type magnetic read head 100 is shown. The conventional magnetic read head 100 comprises a read sensor 134, a bottom magnetic shield 112, and a top magnetic shield 146, where the read sensor 134 is positioned between the magnetic shields. There is an insulator layer 125 on each side of the read sensor 134. The bottom magnetic shield 112 has its magnetic moment fixed in the minus width direction (-X direction). On the other hand, the top magnetic shield 146 has its magnetic moment fixed in the plus width direction (+X direction). In other words, the magnetic moments of the top magnetic shield 146 and bottom magnetic shield 112 are in opposite directions in an antiparallel magnetization state. As magnetic shields, the magnetic moments of the bottom magnetic shield 112 and top magnetic shield 146 move slightly in response to the stray magnetic fields from other bits that are not the target bit. It will be understood that, when a magnetic moment of a magnetic shield is fixed in this conventional embodiment, it is meant that the average magnetic moment of the magnetic shield is directed in the +X direction or the -X direction. In contrast to conventional spin valve sensors with only one free magnetic layer, the read sensor 134 comprises a spacer 130, a first free magnetic layer 128, and a second free magnetic layer 132 stacked and formed such that the spacer 130 is positioned between the two free magnetic layers. The magnetization directions of the first free magnetic layer 128 ($\mu_{FL1}$) and second free magnetic layer 132 ($\mu_{FL2}$) change in response to an external magnetic field from the target bit to the medium that flows in the Y-axis direction. A first coupling layer 126 is interposed between the bottom magnetic shield 112 and the first free magnetic layer 128, and a second coupling layer 138 is interposed between the top magnetic shield 146 and the second free magnetic layer 132. In other words, since the first free magnetic layer 128 is magnetically coupled to the bottom magnetic shield 112 through the first coupling layer 126, changes in the magnetic moment of the bottom magnetic shield 112 can also affect the magnetic moment of the first free magnetic layer 128. Likewise, since the second free magnetic layer 132 is magnetically coupled to the top magnetic shield 146 through the second coupling layer 138, changes in the magnetic moment of the top magnetic shield 146 can also affect the magnetic moment of the second free magnetic layer 132. Moreover, the magnetic shields absorb noise, or magnetic flux coming from other bits that are not the target bit, compromising the read resolution of the read sensor 134. Consequently, the magnetic read gap, or the distance between the top and bottom magnetic shields, must be configured to be much wider relative to the physical read gap, or the bit length, thereby reducing recording density.

Referring to FIG. 5, an air bearing surface view of a TMR magnetic read head 10 according to the first embodiment of the invention is shown. Magnetization directions are represented by arrows superimposed on selected layers. The read head 10 comprises a bottom magnetic shield 12. Positioned above the bottom magnetic shield 12 are a first non-magnetic seed layer 14, a first magnetic seed layer 18, a second non-magnetic seed layer 20, a first antiferromagnetic (AFM) layer 22, a first coupling layer 26, a first free magnetic layer 28, a spacer layer 30, and a second free magnetic layer 32, in this order. A pair of magnetic side shields 36 is positioned on respective sides of the second free magnetic layer 32. Positioned above the second free magnetic layer 32 are a cap layer 38, a first top magnetic layer 40, anti-parallel coupling layer 42, a second top magnetic layer 44, and second antiferromagnetic (AFM) layer 46, in this order. An insulator layer 25, positioned between the magnetic side shields 36 and the first coupling layer 26, wraps around the read sensor 34 to prevent sensing current from flowing through any other portion except for the read sensor 34. Since there is no magnetic interaction between the first magnetic seed layer 18 and the first free magnetic layer 28, and there is also no magnetic interaction between the top magnetic layer 40 and the second free magnetic layer 32, the magnetic flux going through the first magnetic seed layer 18 or the first top magnetic layer 40 does not affect the first free magnetic layer 28 or the second free magnetic layer 32. Here, the magnetic read gap (RG) is defined as the distance between the first magnetic seed layer 18 and the first top magnetic layer 40. As illustrated by arrows, X components of the magnetic moments of the first free magnetic layer 28 and second free magnetic layer 32 are in opposite directions in an antiparallel magnetization state. As depicted in FIG. 3, the magnetic moment of the first free magnetic layer 28 is directed in the +θ direction, while the magnetic moment of the second free magnetic layer 32 is directed in the −θ direction. The first free magnetic layer 28 is magnetically coupled to the first AFM layer 22 and receives a bias field in the +X direction. It will be appreciated that the first AFM layer 22 and the second AFM layer 46 do not have spontaneous magnetization, but have ordered magnetic moments at the atomic level. Likewise, the second free magnetic layer 32 is magnetically coupled to the magnetic side shields 36 by magnetostatic interaction through direct contact or close physical proximity with one another, and the second free magnetic layer 32 has no magnetic interaction with the first top magnetic layer 40. The bottom magnetic shield 12, the first magnetic seed layer 18, the first top magnetic layer 40, the second top magnetic layer 44, and magnetic side shields 36 are formed of electrically conductive ferromagnetic material, such as NiFe, and function to absorb stray magnetic fields coming from recorded data bits other than the target bit and prevent them from affecting the read sensor 34.

The first non-magnetic seed layer 14 may comprise a Ta or Co-based amorphous alloy and have a thickness of 15 Å. The first magnetic seed layer 18 and first top magnetic layer 40 may comprise a NiFe alloy and have a thickness of 200 to 300 Å. The second non-magnetic seed layer 20 may comprise Ru or Ir and have a thickness of 10 Å or less. The first AFM layer 22 may comprise MnIr alloy and have a thickness of between 60 and 80 Å. The first coupling layer 26 may comprise double layers of CoFe alloy and Co based amorphous alloy. The first coupling layer 26 may also comprise a Ru component layer as one of the sandwiched layers of CoFe alloy and Ru/CoFe alloy, or one of the sandwiched layers of NiFe alloy and Ru/NiFe alloy. The Co-based amorphous alloy may comprise Co and at least one of the elements chosen from Ta, Zr, Nb, Hf, and Ti. The first coupling layer 26 may comprise at least a Ru component layer. The insulator layer 25 may comprise $Al_2O_3$. The spacer layer 30 may comprise a structure such as MgO, Ag, and Cu and have a thickness of 5 to 50 Å. The cap layer 38 may comprise Ru or ferromagnetic materials such as Ni or Ni alloys.

The first AFM layer 22, positioned between the bottom magnetic shield 12 and the first coupling layer 26, and the magnetic side shields 36, positioned on respective sides of the second free magnetic layer 32, improve the read resolution of the read sensor 34 by acting as longitudinal bias measures within the magnetic read gap that are magnetically independent from the first magnetic seed layer 18, the bottom magnetic shield 12, the first top magnetic layer 40, and the second top magnetic layer 44. The first magnetic seed layer 18, the bottom magnetic shield 12, the first top magnetic layer 40, and the second top magnetic layer 44 work as a shield, which functions to absorb stray magnetic fields coming from bits on the media that are not the target bit. Since the above mentioned longitudinal biasing measures are magnetically independent of these shield layers, they reduce the amount of noise coming from the other bits and improve resolution. However, in this embodiment, the effective thickness of the first AFM layer 22 may need to reach as much as 80 Å, which may complicate attempts to reduce the width of the magnetic read gap to a target of less than 300 Å (30 nm) and achieve a favorable read resolution of the read sensor 34.

Continuing with FIG. 6, an air bearing surface view of a TMR magnetic read head 200 according to the second embodiment of the invention is shown. Since the read head 200 of the second embodiment is generally similar to that of the first embodiment with the exception of the grain growth seed layer 216 and the thickness and material of the first AFM layer 222, the detailed description thereof is abbreviated here for the sake of brevity. It is to be noted that like parts are designated by like reference numerals throughout the detailed description and the accompanying drawings. In this embodiment, the read head 200 comprises a bottom magnetic shield 212. Positioned above the bottom magnetic shield 212 are a first non-magnetic seed layer 214, a grain growth seed layer 216, a first magnetic seed layer 218, a second non-magnetic seed layer 220, an AFM layer 222, a first coupling layer 226, a first free magnetic layer 228, a spacer layer 230, and a second free magnetic layer 232, in this order. An insulator layer 225, positioned between the magnetic side shields 236 and the first coupling layer 226, wraps around the read sensor 234 to prevent sensing current from flowing through any other portion except for the read sensor 234. A pair of magnetic side shields 236 is positioned on respective sides of the second free magnetic layer 232. Positioned above the second free magnetic layer 232 are a cap layer 238, a first top magnetic layer 240, anti-parallel coupling layer 242, a second top magnetic layer 244, and second antiferromagnetic (AFM) layer 246, in this order.

The first non-magnetic seed layer 214 may comprise a Ta or Co-based amorphous alloy and have a thickness of 15 Å. The first magnetic seed layer 218 may comprise a NiFe alloy and may have a thickness of 200 to 300 Å. The second non-magnetic seed layer 220 may comprise Ru or Ir and have a thickness of 10 Å or less. The first AFM layer 222 may comprise L21 ordered Mn3Ir alloy and have a thickness of between 20 and 40 Å. The first coupling layer 226 may comprise double layers of CoFe alloy and Co based amorphous alloy, or at least a Ru component layer as one of the sandwiched layers of CoFe alloy and Ru/CoFe alloy, or one of the sandwiched layers of NiFe alloy and Ru/NiFe alloy. The Co-based amorphous alloy may comprise Co and at least one of the elements chosen from Ta, Zr, Nb, Hf, and Ti.

The grain growth seed layer 216, sandwiched between the first magnetic seed layer 218 and the first non-magnetic seed layer 214, promotes the lateral grain growth of NiFe in the first magnetic seed layer 218, increasing the average grain diameter from approximately 10 nm to as large as 20-30 nm. Increased crystal size in the first magnetic seed layer 218 also enhances crystal growth in layers directly above the first magnetic seed layer 218, including the second non-magnetic seed layer 220 and the first AFM layer 222. The grain growth seed layer 216 may comprise an alloy of Ni base fcc element and third transition metal bcc elements chosen from Cr, V, Mn, Fe, Ti, and Mo—one example is (Ni-20% Fe) or Ni-based Cr alloy of which the Cr content is 35 to 45 at %. Furthermore, the MnIr alloy of the AFM layer 222 may comprise $L_{21}$ ordered $Mn_3Ir$ alloy instead of the disordered $Mn_3Ir$ alloy that forms the AFM layer in the first embodiment, raising the mean blocking temperature of the first AFM layer 222 and enabling the reduction of the thickness of the first AFM layer 222 from approximately 70 Å in the first embodiment to a thickness less than 40 Å in the second embodiment. This amounts to a reduction of approximately 40 Å in the magnetic read gap (RG) compared to the first embodiment, where the magnetic read gap may be as high as 30 nm. In the second embodiment, the magnetic read gap may be reduced to as low as 20 nm or less, thereby achieving a higher recording density.

Figure 7:
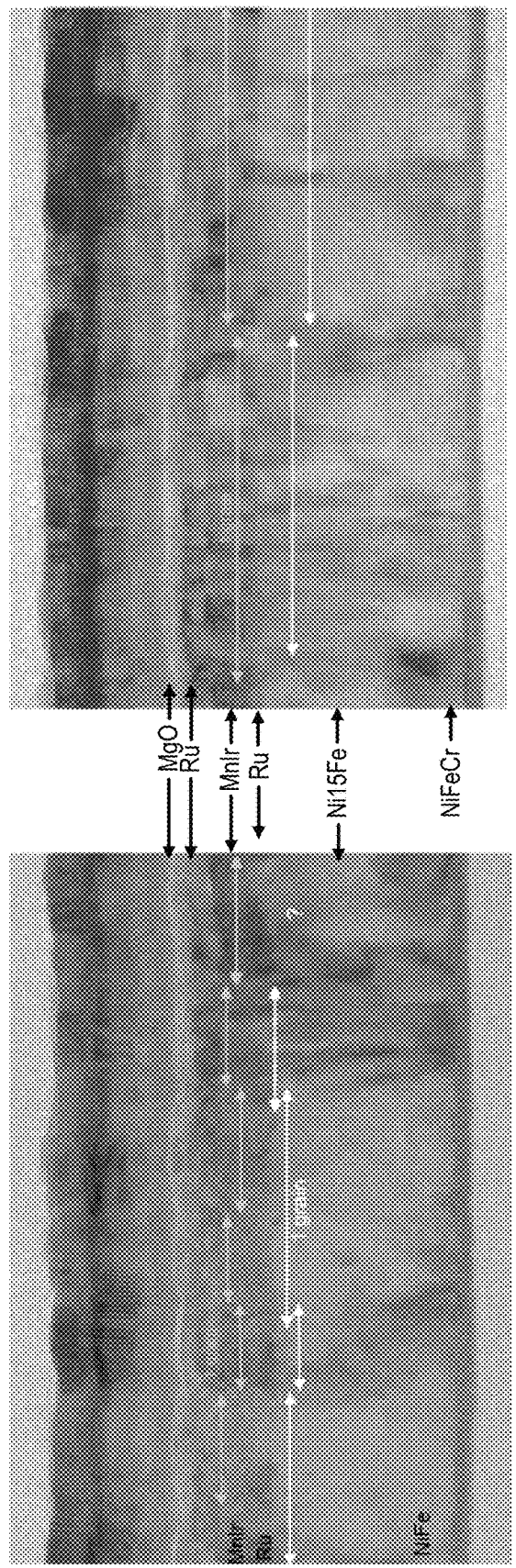
FIG. 7 are photographic views of cross-sectional TEM photographs of the read heads of the first and second embodiments of the invention.

FIG. 7 shows photographic views of cross-sectional scanning electron microscopy (SEM) photographs of read heads of the first and second embodiments. The left photograph represents a cross-sectional view of a read sensor film of the first embodiment, where the grain growth seed layer is absent, while the right photograph represents a cross-sectional view of a read sensor film of the second embodiment, which is configured with a grain growth seed layer. Each grain in the AFM layer is visible as a surface irregularity or a lump, as indicated by the gray and white bidirectional arrows in the photographs. Compared to the first embodiment, the grains in the AFM layer of the second embodiment are much larger, significantly reducing the surface irregularities of the AFM layer. It is thought that the presence of a grain growth seed layer enhances crystal growth of each grain of NiFe alloy in the first magnetic seed layer, and by extension, each grain of MnIr in the AFM layer, thereby allowing a thinner MnIr layer to achieve the same mean blocking temperature. A flatter surface of the AFM layer may also flatten the layers that are positioned above the AFM layer, including the spacer layer and the coupling layer which may comprise MgO and Ru in this example. The coupling strength of the coupling layer may also be enhanced by the reduction of surface irregularities.

Figure 8:
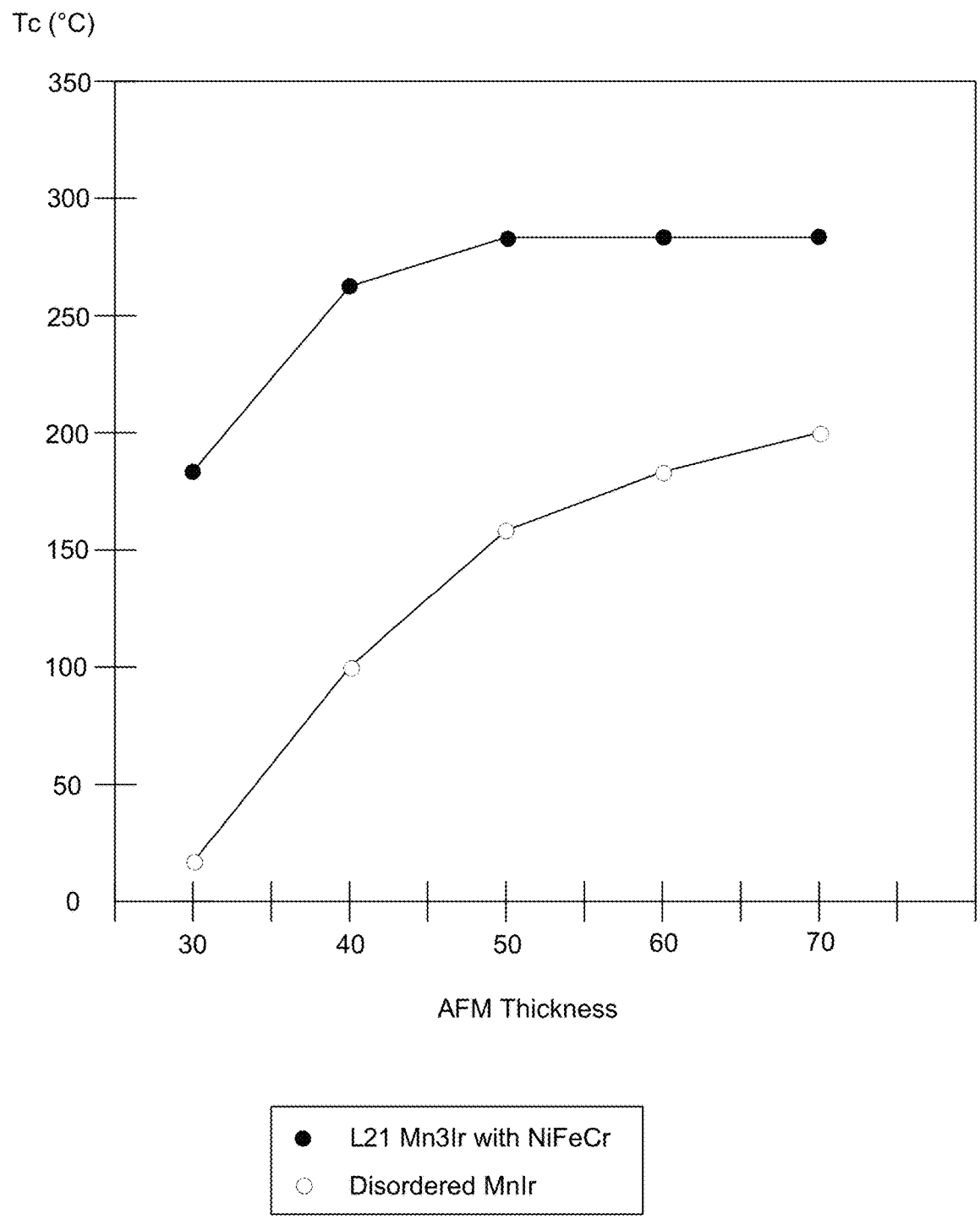
FIG. 8 is a plot illustrating the dependence of the mean blocking temperature (Tc) on the thickness of the antiferromagnetic layer, the open circle symbol representing the first embodiment using disordered MnIr alloy without the grain growth seed layer, and the closed circle symbol representing the second embodiment using L21 ordered Mn3Ir alloy and grain growth seed layer.

As shown in FIG. 8, the mean blocking temperature (Tc) is dependent on the thickness of the AFM layer and the ordering of the MnIr alloy in the AFM layer. Experimental evidence was compiled to show the relationship between the mean blocking temperature Tc and thickness of the AFM layer, as depicted between two cases: the first embodiment, represented by the white dots, in which a grain growth seed layer is absent and the AFM comprises disordered MnIr alloy, and the second embodiment, represented by the dark dots, in which a (Ni-20 at % Fe)-40 at % Cr grain growth seed layer with a 60 Å thickness is present and the AFM layer comprises ordered $L_{21}$ $Mn_3Ir$ alloy with NiFeCr. In both embodiments, an increase in AFM layer thickness is correlated with an increase in the mean blocking temperature. However, the second embodiment demonstrates higher mean blocking temperatures at the same AFM layer thicknesses compared to the first embodiment, thereby requiring a lower thickness of the AFM layer to achieve the same blocking temperature Tc as the first embodiment. For the AFM layer, it is desirable to configure a high mean blocking temperature to ensure a stable, fixed magnetic moment at normal operating temperatures. By maintaining a high blocking temperature at reduced thicknesses of the AFM layer, the magnetic read gap can be reduced by approximately 40 Å.

Figure 9:
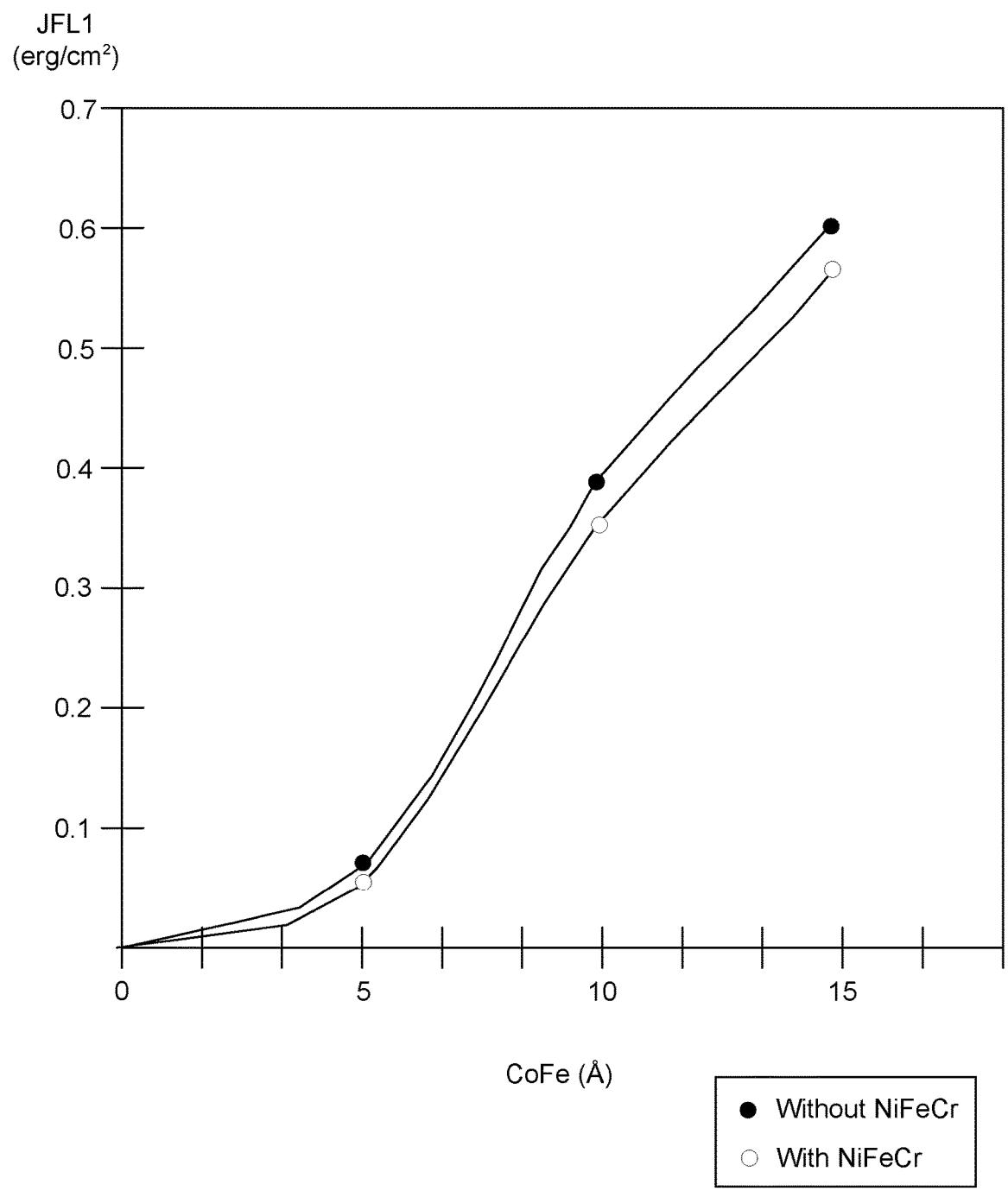
FIG. 9 is a plot illustrating the dependence of the coupling strength of the coupling layer on the thickness of the Co-25 at % Fe component of a coupling layer according to the first and second embodiments of the invention.

Referring to FIG. 9, the coupling strength JFL1 of the coupling layer is dependent on the thickness of the Co-25 at % Fe component of a coupling layer that comprises Co-25 at % Fe/CoFeBTa. Experimental evidence was compiled to show the relationship between the coupling strength JFL1 of the coupling layer and the thickness of the Co-25 at % Fe component of a coupling layer as depicted between two cases: the first embodiment, represented by the dark dots, in which a grain growth seed layer is absent and the AFM comprises disordered MnIr alloy, and the second embodiment, represented by the white dots, in which a (Ni-80 at % Fe)-40 at % Cr grain growth seed layer with a 60 Å thickness is present and the AFM layer comprises ordered $L_{21}$ $Mn_3Ir$ alloy with NiFeCr. For both embodiments, the coupling layer comprised a CoFeBTa component with a thickness that was constant at 10 Å and a Co-25 at % Fe component with a thickness that was varied at 0, 5, 10, and 15 Å. Furthermore, the first free magnetic layer comprised a Ni layer (30 Å), CoFeBTa layer (25 Å), a CoFeB layer (10 Å), and a CoFe layer (5 Å) that were positioned above the coupling layer, in this order. As the thickness of the Co-25 at % Fe component increased, the coupling strength JFL1 likewise increased. The experimental evidence also showed that, even if a grain growth seed layer with NiFeCr is introduced, the resulting decrease in coupling strength is minimal. In this Figure, it will be appreciated that the coupling strength is in a positive direction for all thicknesses of the Co-25 at % Fe component in the coupling layer.

Figure 10:
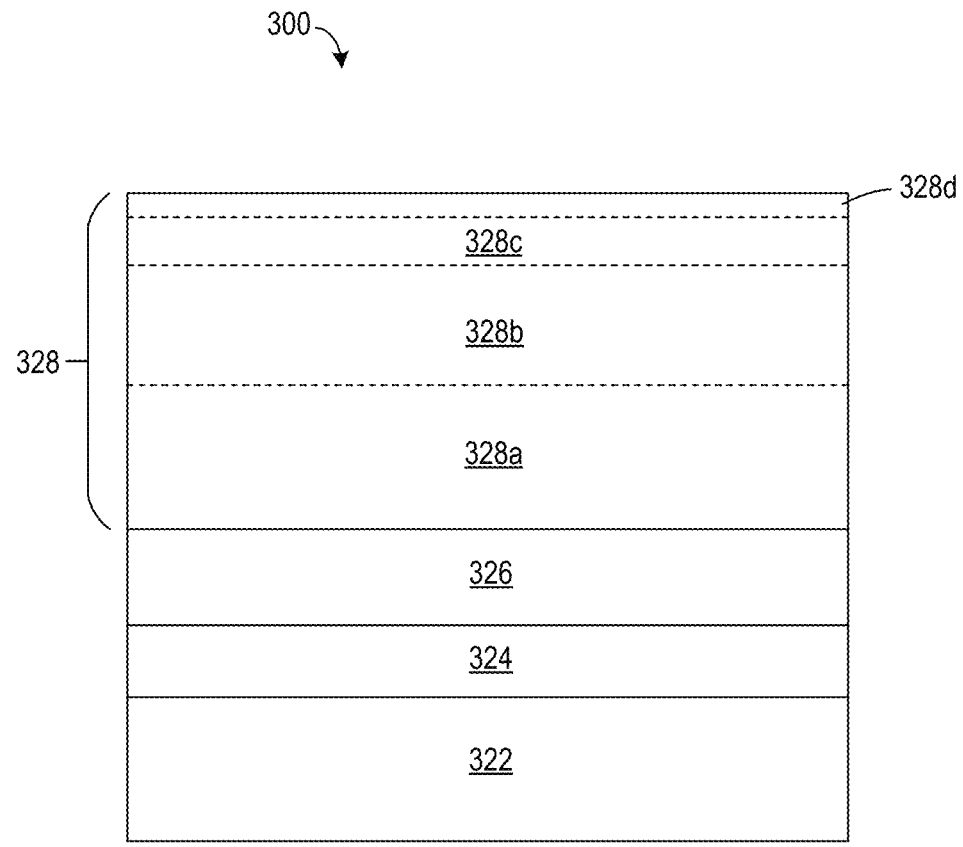
FIG. 10 is an air bearing surface view of a magnetic read head according to the third embodiment of the invention.

Referring to FIG. 10, an air bearing surface view of a TMR magnetic read head 300 according to the third embodiment of the invention is shown. Since the read head 300 of the third embodiment is generally similar to that of the second embodiment with the exception of the pinned layer 324, the detailed description and illustration thereof is abbreviated here for the sake of brevity. It is to be noted that like parts are designated by like reference numerals throughout the detailed description and the accompanying drawings. In this embodiment, the pinned layer 324 comprises a Co—Fe alloy, the first coupling layer 326 comprises a Ru layer sandwiched by two respective Co—Fe alloy layers, each with a thickness of 5 Å, and the pinned layer 324 is positioned between the AFM layer 322 and the first coupling layer 326. The first coupling layer 326 may further comprise a Co-based amorphous magnetic material layer on each Co—Fe alloy layer. The pinned layer 324 is a magnetic layer with a magnetization direction that is pinned parallel to the ABS by exchange coupling with the AFM layer 322. The first free magnetic layer 328 comprises a Ni layer 328a (30 Å), CoFeBTa layer 328b (25 Å), a CoFeB layer 328c (10 Å), and a CoFe layer 328d (5 Å) that are positioned above the first coupling layer 326, in this order. It will be appreciated that the pinned layer 324 may be omitted from the read head 300 as desired, when the first coupling layer 326 comprises a Co-based amorphous magnetic material layer on each CoFe alloy layer, to adjust the coupling strength of the first coupling layer 326. Alternatively, the pinned layer 324 may be incorporated as one of the layers that comprise the first coupling layer 326.

Figure 11:
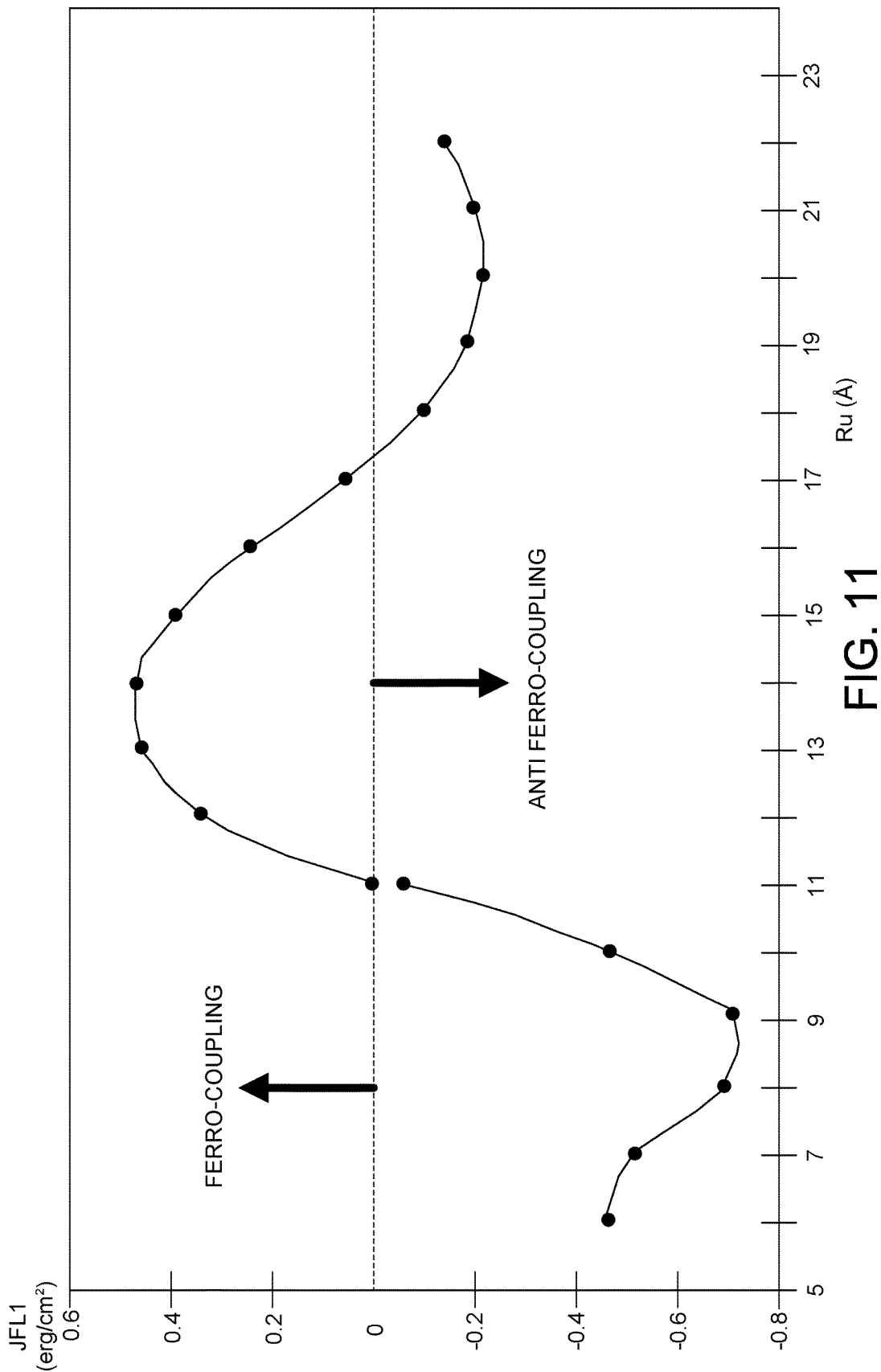
FIG. 11 is a plot illustrating the dependence of the coupling strength of the coupling layer on the thickness of the Ru component layer of a coupling layer according to the third embodiment of the invention.

Referring to FIG. 11, in the third embodiment, the coupling strength JFL1 of the first coupling layer 326 is dependent on the thickness of the Ru component of the first coupling layer 326. Experimental evidence was compiled for a read head of the third embodiment in which the coupling layer comprised two CoFe components with a thickness that was constant at 5 Å and a Ru component, sandwiched between the two CoFe components, with a thickness that was varied between 6 and 22 Å. When the thickness of the Ru component ranged between approximately 5 and 11 Å and between approximately 17 and 22 Å, the coupling strength of the coupling layer was set in an anti-parallel direction (anti-ferro coupling direction). On the other hand, when the thickness of the Ru component ranged between approximately 11 and 17 Å, the coupling strength of the coupling layer was set in a parallel direction (ferro coupling direction). Unlike the first and second embodiments, the coupling strength of the coupling layer peaks at two thicknesses of the Ru component: the coupling strength in the anti-parallel direction peaks at approximately $-0.7$ erg/cm$^2$ at a thickness of approximately 8 Å, while the coupling strength in the parallel direction peaks at approximately 0.4 erg/cm$^2$ at a thickness of approximately 14 Å. The relative stability of the coupling strength at these two thicknesses confers a potential advantage if a parallel coupling strength of approximately 0.4 erg/cm$^2$ or an anti-parallel coupling strength of approximately $-0.8$ erg/cm$^2$ is desired for the coupling layer of the third embodiment.

Referring to FIG. 12, an air bearing surface view of a TMR magnetic read head 400 according to the fourth embodiment of the invention is shown. Since the read head 400 of the fourth embodiment is generally similar to that of the third embodiment with the exception of the first coupling layer 426 and the first free magnetic layer 428, the detailed description and illustration thereof is abbreviated here for the sake of brevity. It is to be noted that like parts are designated by like reference numerals throughout the detailed description and the accompanying drawings. In this embodiment, the pinned layer 424 comprise a Co—Fe alloy, the first coupling layer 426 may comprise a Ru layer sandwiched by two respective Ni—Fe alloy layers, each with a thickness of 5 Å, and the pinned layer 424 is sandwiched between the AFM layer 422 and the first coupling layer 426. The pinned layer 424 is a magnetic layer with a magnetization direction that is pinned parallel to the ABS by exchange coupling with the AFM layer 422. The first free magnetic layer 428 comprises a Ni15Fe layer 428a (40 Å) and Co10Fe layer 428b (10 Å) that are positioned above the first coupling layer 426, in this order. It will be appreciated that the pinned layer 424 may be omitted from the read head 400 as desired, when the first coupling layer 426 comprises a Co-based amorphous magnetic material layer on each CoFe alloy layer, to adjust the coupling strength of the first coupling layer 426. Alternatively, the pinned layer 424 may be incorporated as one of the layers that comprise the first coupling layer 426.

Figure 13:
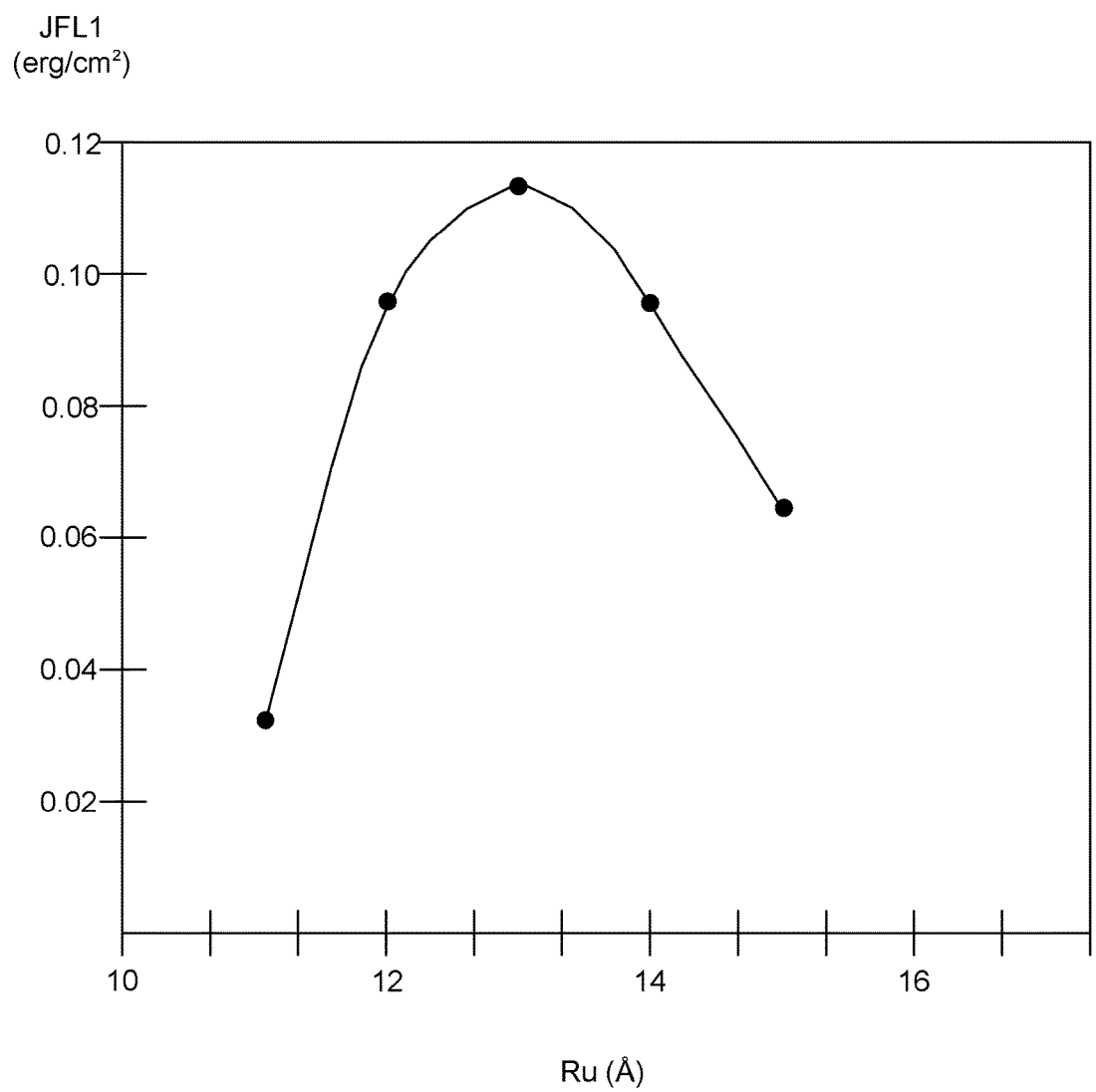
FIG. 13 is a plot illustrating the dependence of the coupling strength of the coupling layer on the thickness of the Ru component layer of a coupling layer according to the fourth embodiment of the invention.

Referring to FIG. 13, in the fourth embodiment, the coupling strength JFL1 of the first coupling layer 426 is dependent on the thickness of the Ru component of the first coupling layer 426. Experimental evidence was compiled for a read head of the fourth embodiment in which the coupling layer comprised two NiFe components with a thickness that was constant at 5 Å and a Ru component, sandwiched between the two NiFe components, with a thickness that was varied at 11, 12, 13, 14, and 15 Å. In this example, the coupling strength peaked at 0.11 erg/cm$^2$ at a thickness of the Ru component of 13 Å. The relative stability of the coupling strength at this thickness confers a potential advantage if a parallel coupling strength of approximately 0.11 erg/cm$^2$ is desired for the coupling layer of the fourth embodiment.

It will be understood that the configurations and/or approaches described herein are exemplary in nature, and that these specific embodiments or examples are not to be considered in a limiting sense, because numerous variations are possible. The specific methods described herein include processes illustrated and/or described that may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A magnetic sensor comprising:
   a first seed layer, a magnetic seed layer, a second seed layer, an antiferromagnetic layer, a coupling layer, a first free magnetic layer, a spacer layer, and a second free magnetic layer positioned in this order;
   wherein the antiferromagnetic layer provides longitudinal biasing of the first free magnetic layer.

2. A magnetic sensor comprising:
   a first seed layer, a magnetic seed layer, a second seed layer, an antiferromagnetic layer, a coupling layer, a first free magnetic layer, a spacer layer, and a second free magnetic layer positioned in this order, wherein the first seed layer comprises a Ta or a Co-based amorphous alloy, the magnetic seed layer comprises a NiFe alloy, the second seed layer comprises Ru or Ir, the antiferromagnetic layer comprises a MnIr alloy, and the coupling layer comprises double layers of a CoFe alloy and a Co-based amorphous alloy, sandwiched layers of a CoFe alloy and a Ru/CoFe alloy, or sandwiched layers of a NiFe alloy and a Ru/NiFe alloy.

3. A magnetic sensor comprising:
   a bottom magnetic shield;
   a first seed layer, a magnetic seed layer, a second seed layer, an antiferromagnetic layer, a coupling layer, a first free magnetic layer, a spacer layer, and a second free magnetic layer positioned above the bottom magnetic shield, in this order; and
   a pair of magnetic side shield layers positioned on respective sides of the second free magnetic layer;
   wherein the antiferromagnetic layer provides longitudinal biasing of the first free magnetic layer.

4. The magnetic sensor of claim 3, wherein
the first seed layer comprises a Ta-based or a Co-based amorphous alloy, the magnetic seed layer comprises a NiFe alloy, the second seed layer comprises Ru or Ir, the antiferromagnetic layer comprises a MnIr alloy, and the coupling layer comprises double layers of a CoFe alloy and a Co-based amorphous alloy, sandwiched layers of a CoFe alloy and a Ru/CoFe alloy, or sandwiched layers of a NiFe alloy and a Ru/NiFe alloy.

5. The magnetic sensor of claim 4, wherein
the Co-based amorphous alloy comprises Co and at least one of the elements chosen from Ta, Zr, Nb, Hf, and Ti.

6. The magnetic sensor of claim 4, wherein the coupling layer comprises at least a Ru component layer.

7. A hard disk drive comprising a read head comprising the magnetic sensor of claim 3.

8. A magnetic sensor comprising:
a bottom magnetic shield;
a first seed layer, a grain growth seed layer, a magnetic seed layer, a second seed layer, an antiferromagnetic layer, a coupling layer, a first free magnetic layer, a spacer layer, and a second free magnetic layer positioned above the bottom magnetic shield, in this order; and
a pair of magnetic side shield layers positioned on respective sides of the second free magnetic layer.

9. The magnetic sensor of claim 8, wherein:
the first seed layer comprises a Ta-based or a Co-based amorphous alloy;
the grain growth seed layer comprises an alloy of Ni base fcc element and at least one third transition metal bcc element chosen from Cr, V, Mn, Fe, Ti, and Mo;
the magnetic seed layer comprises a NiFe alloy;
the second seed layer comprises Ru or Ir;
the antiferromagnetic layer comprises a MnIr alloy; and
the coupling layer comprises double layers of a CoFe alloy and a Co-based amorphous alloy, sandwiched layers of a CoFe alloy and a Ru/CoFe alloy, or sandwiched layers of a NiFe alloy and a Ru/NiFe alloy.

10. The magnetic sensor of claim 9, wherein
the grain growth seed layer comprises (Ni-20% Fe) or a Ni-based Cr alloy of which Cr content is 35 to 45at %.

11. The magnetic sensor of claim 9, wherein
the thickness of the antiferromagnetic layer is less than 40 Å.

12. The magnetic sensor of claim 9, wherein
wherein the MnIr alloy includes $L_{2_1}$ ordered $Mn_3Ir$ alloy.

13. The magnetic sensor of claim 9, wherein
the Co-based amorphous alloy comprises Co and at least one of the elements chosen from Ta, Zr, Nb, Hf, and Ti.

14. The magnetic sensor of claim 9, wherein
the coupling layer comprises at least a Ru component layer.

15. The read head magnetic sensor of claim 14, wherein
the coupling layer comprises the Ru component layer sandwiched by two respective Co-Fe alloy layers.

16. The magnetic sensor of claim 15, wherein
the coupling layer further comprises a Co-based amorphous magnetic material layer on each Co-Fe alloy layer.

17. The magnetic sensor of claim 16, wherein
the Co-based amorphous magnetic material layer comprises Co and at least one of the elements chosen from Ta, Zr, Nb, Hf, and Ti.

18. The magnetic sensor of claim 14, wherein
the coupling layer comprises the Ru component layer sandwiched by two respective Ni-Fe alloy layers.

19. The magnetic sensor of claim 14, wherein
a pinned layer is positioned between the coupling layer and the antiferromagnetic layer.

20. The magnetic sensor of claim 19, wherein
the pinned layer comprises a Co—Fe alloy.

21. A hard disk drive comprising a read head comprising the magnetic sensor of claim 8.

22. A magnetic sensor comprising:
a bottom magnetic shield; and
a first seed layer, a magnetic seed layer, a second seed layer, an antiferromagnetic layer, a coupling layer, a first free magnetic layer, a spacer layer, and a second free magnetic layer positioned above the bottom magnetic shield, in this order, wherein
a pair of magnetic side shield layers positioned on respective sides of the second free magnetic layer,
the first seed layer comprises a Ta or a Co-based amorphous alloy, the magnetic seed layer comprises a NiFe alloy, the second seed layer comprises Ru or Ir, the antiferromagnetic layer comprises a MnIr alloy, and the coupling layer comprises double layers of a CoFe alloy and a Co-based amorphous alloy, sandwiched layers of a CoFe alloy and a Ru/CoFe alloy, or sandwiched layers of a NiFe alloy and a Ru/NiFe alloy.

* * * * *